(12) United States Patent
Peng et al.

(10) Patent No.: US 6,877,889 B2
(45) Date of Patent: Apr. 12, 2005

(54) STRUCTURE OF LUMINOUS PET LEAD

(75) Inventors: Chi-Tsung Peng, Hsin-Chu (TW); Wen-Chung Yen, Hsin-Chu (TW)

(73) Assignee: Baycom Opto-Electronics Technology Co., Ltd., Hsinchu (TW)

( * ) Notice: Subject to any disclaimer, the term of this patent is extended or adjusted under 35 U.S.C. 154(b) by 48 days.

(21) Appl. No.: 10/640,436

(22) Filed: Aug. 12, 2003

(65) Prior Publication Data
US 2004/0136205 A1 Jul. 15, 2004

(30) Foreign Application Priority Data
Jan. 9, 2003 (TW) .................................. 92200405 U

(51) Int. Cl.[7] .................................................. F21L 4/00
(52) U.S. Cl. .................. 362/570; 362/103; 362/108; 362/554; 362/555; 362/577; 119/859
(58) Field of Search ............................... 362/103, 108, 362/554, 555, 570, 577; 119/859

(56) References Cited

U.S. PATENT DOCUMENTS 5,850,807 A * 12/1998 Keeler .......................... 362/554

2002/0122316 A1 * 9/2002 Hsieh ........................... 362/570

* cited by examiner

Primary Examiner—Stephen F. Husar
(74) Attorney, Agent, or Firm—Birch, Stewart, Kolasch & Birch, LLP

(57) ABSTRACT

The invention related to a structure of luminous pet lead, comprising luminous collar and luminous lead, separately with multiple plastic optical fiber on outer layer and hollow tubule on inner layer, twisted into a long cable; one lamp box respectively connected to the both ends of the cable, and LED luminous source set in the box, LED light can shine through the cross section of plastic optical fiber; additionally, a battery holder set on the lamp box at one end, and battery holder power connected onto the lamp box at the other end through hollow tubule of twisting cable using electrical conductor so that single battery holder can enable LED at both ends of the cable luminous at the same time in order to enhance luminous brightness of plastic optical fiber, and enable pet collar or lead has lighting indication and decoration functions during night use.

4 Claims, 5 Drawing Sheets

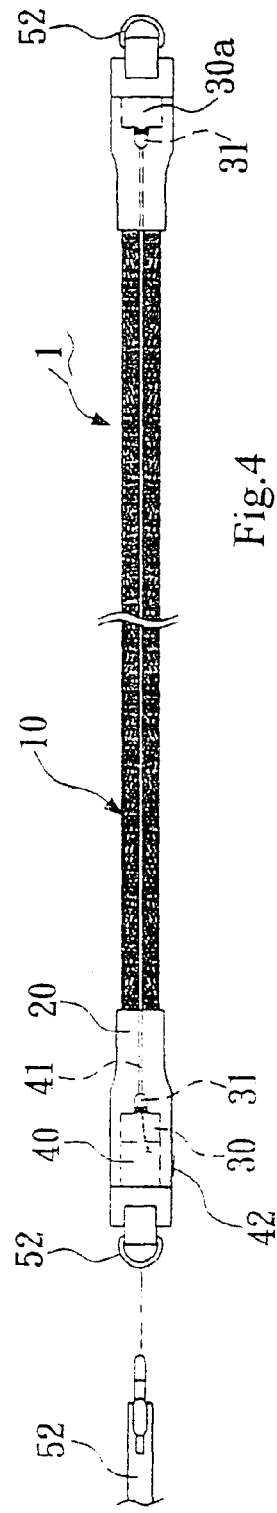
Fig.4
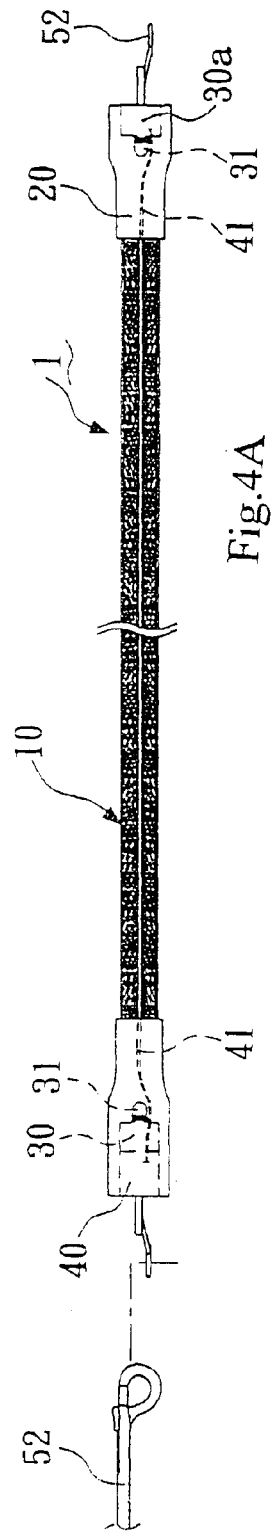
Fig.4A
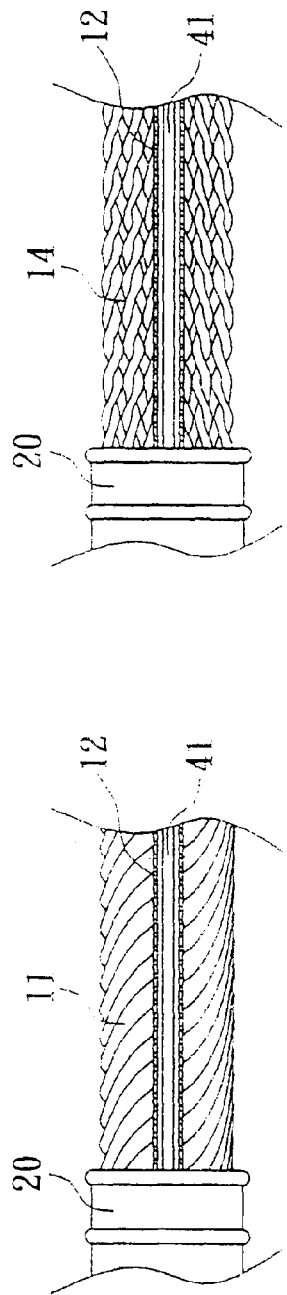
Fig.5
Fig.5A

US 6,877,889 B2

STRUCTURE OF LUMINOUS PET LEAD

BACKGROUND OF THE INVENTION

1. Field of the Invention

The present invention related to a structure of luminous pet lead, and particularly to multiple plastic fiber and hollow tubule twisted into a long cable with electrical conductor line through its hollow tubule of cable, its single battery holder can enable LED at both ends of the cable luminous at the same time and shine the end face of plastic optical fiber in cable, in order to enhance luminous brightness of pet collar or lead applied at night.

2. Description of Related Art

At present, plastic optical fiber (POF) has better flexibility and hard broken than glass optical fiber, with lower production cost, and can be widely used, including: light guide of plastic fiber is applicable to visual or monitor illuminator; Or removing a part of cladding on peripheral surface of plastic fiber to form core scar, which enables the side light leak illuminating effect of shinning light and applicable to lightening and decoration of articles or staircase, such as the creation optical fiber with continual point lighting (No. 86101437) of announcement no. 348221, Taiwan. The conventional plastic fiber illuminants above-mentioned adopt light engine structure as luminous source, and the light engine structure consists of bulb, rotation color disk driven by motor and condensing lens, and generally use external power supply; projection source color changed through rotation color disk, condensed via condensing lens, and projected on a section end of plastic optical fiber or fiber bundle, to achieve luminous effect of sufficient brightness of plastic optical fiber or fiber bundle, However, the cost of whole unit is higher, especially in case of larger engine volume and weight, it shall be placed on seat, and the distance between light engine and fiber optic tube bundle is relatively lengthen, this will influence not only the appearance but also the operation convenience; besides, luminous decoration with plastic optical fiber fails to enable users to easily use it on pet collar or lead for luminous indication and new decoration at night, which is the design regret of plastic optical fiber.

SUMMARY OF THE INVENTION

An object of present invention is to provide a structure of luminous pet lead, specialized for pet collar or lead. It is made in twist cable structure, and with multiple plastic fiber as outer layer, and hollow tubule as inner layer, twisted into a long cable; one lamp box respectively connected to the both ends of the cable, and LED luminous source set in the box, LED light can shine through the cross section of plastic fiber; additionally, a battery holder set on the lamp box at one end, and battery holder power connected onto the lamp box at the other end through hollow tubule of twisting rope using electrical conductor line so that single battery holder can enable LED at both ends of the cable luminous at the same time in order to enhance luminous brightness of plastic optical fiber, and enable pet collar or lead has lighting indication and decoration functions during night use.

BRIEF DESCRIPTION OF THE DRAWINGS

The other objects and features of the present invention can be more fully understood by referring to the following description of preferred embodiments and accompanying drawing, in which:

FIG. 4 is a side section for luminous collar structure of the present invention;

FIG. 4A is a section for the other side in FIG. 4 according to the present invention;

FIG. 5 is a side section for FIG. 2 according to the present invention;

FIG. 5A is side section for FIG. 2A according to the present invention;

DETAILED DESCRIPTION OF THE PREFERRED EMBODIMENT

Figure 1:
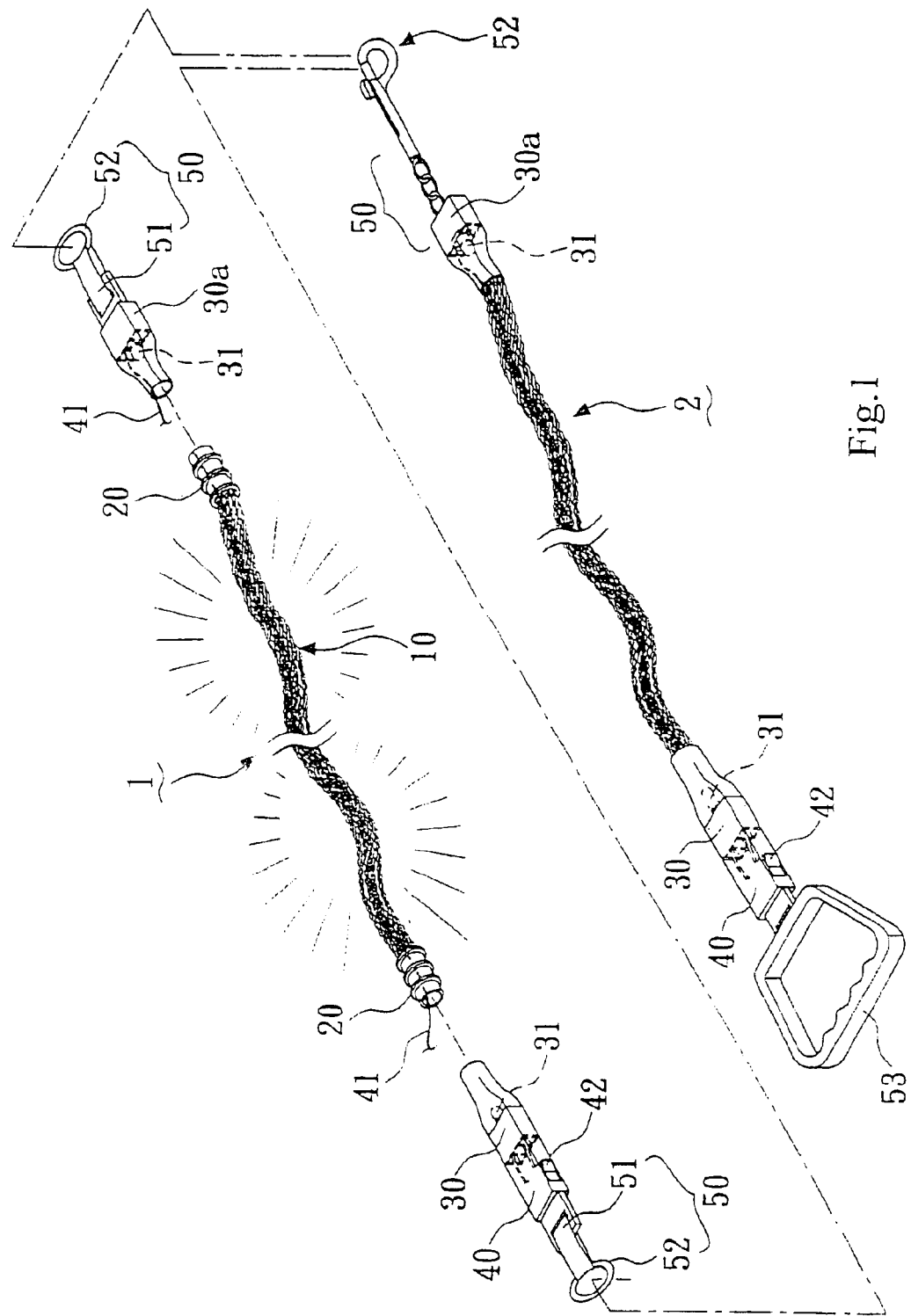
FIG. 1 is a three-dimensional structure of the present invention.

Referring to FIGS. 1, 2, 3, 4 and 5, the invention of a structure luminous pet lead, comprising luminous collar 1 and luminous lead 2, separately consists of a twist cable 10, clamping head 20, two lamp boxes 30, battery holder 40 and relative fitting 50. The cable 10 is twisted with multiple plastic optical fiber 11 as outer layer and flexible hollow tubule 12 as inner layer center, multiple plastic optical fiber 11 wrap on external surface of cable 10; plastic optical fiber 11 has surface hardness and flexibility generated from ribbon plastic optical fiber 11, to form surface protection and withstand collision or pets bit; A clamping head respectively fixed on both ends of the rope 10 to prevent cable loosening; clamping head 20 respectively connected securely with lamp box 30 and 30a; LED lamp 31 built in lamp box 30 and 30a, to make light beam of LED lamp 31 shine into the section 13 at both ends of plastic optical fiber 11, making plastic optical fiber 11 generate light; Lamp box 30 is chosen in two lamp boxes 30 and battery holder 40 is attached on it, battery holder 40 supplies power to LED lamp 31 in lamp box 30, and electrical conductor is reused through interior conduit of hollow tubule 12 in the rope 10, to connect battery holder 40 power onto the lamp box 30a at other end, to make LED lamp inside the lamp box 30a luminous using power from battery holder 40; Shell shapes are not limited to above two lamp boxes 30, 30a or battery holder 40, and the size of components can be properly controlled, and miniaturize design is best, applicable to both separate or combined use of luminous collar 1 and luminous lead 2.

Figure 2A:
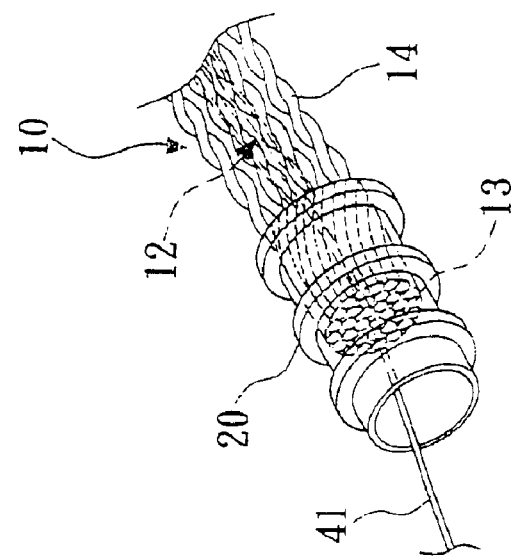
FIG. 2A is a structure for another twisting mode of plastic optical fiber according to FIG. 2.
Figure 3:
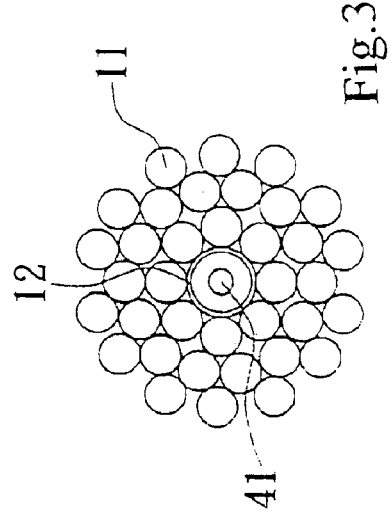
FIG. 3 is a section of cable part in FIG. 2 according to the present invention.
Figure 2:
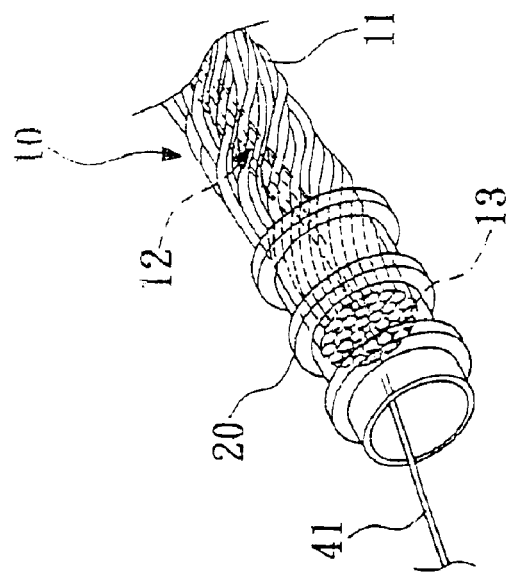
FIG. 2 is a cable part of magnified local structure for the present invention.

Referring to FIGS. 2A and 5A, the twisting modes are not limited to multiple plastic optical fiber 11 and hollow tubule 12 as centre, every two in multiple plastic fiber can be twisted into dual cable 14, again with several dual cable 14 completed as outer layer, and with flexible hollow tubule as inner layer centre, and mutually twisted, and make dual cable 14 of multiple plastic optical fiber 11 wrap on the outer surface of cable 10, and plastic optical fiber 11 has surface hardness and flexibility generated from ribbon plastic fiber, to form surface protection and withstand collision or pets bit;

Switch 42 can be setup on the surface of battery holder 40 or lamp box 30 to control the start-stop of LED lamp; LED lamp 31 inside lamp box 30 and 30a can be single or one above, and color of LED lamp 31 is not limited, and current available electronic technology can be adopted to achieve multiple light control effects such as simultaneous open, close or cross flash or simultaneous flash for user choice.

In addition, fitting 50 refers to existing unit on general pets collar or lead, including adjusting mechanism 51 that adjusts the length of whole collar, becket 52 in different designs for connecting collar and lead, or grip 53 for hand holding on lead, all of them are common components under free change and design, so, these are not detailed here.

Figure 6:
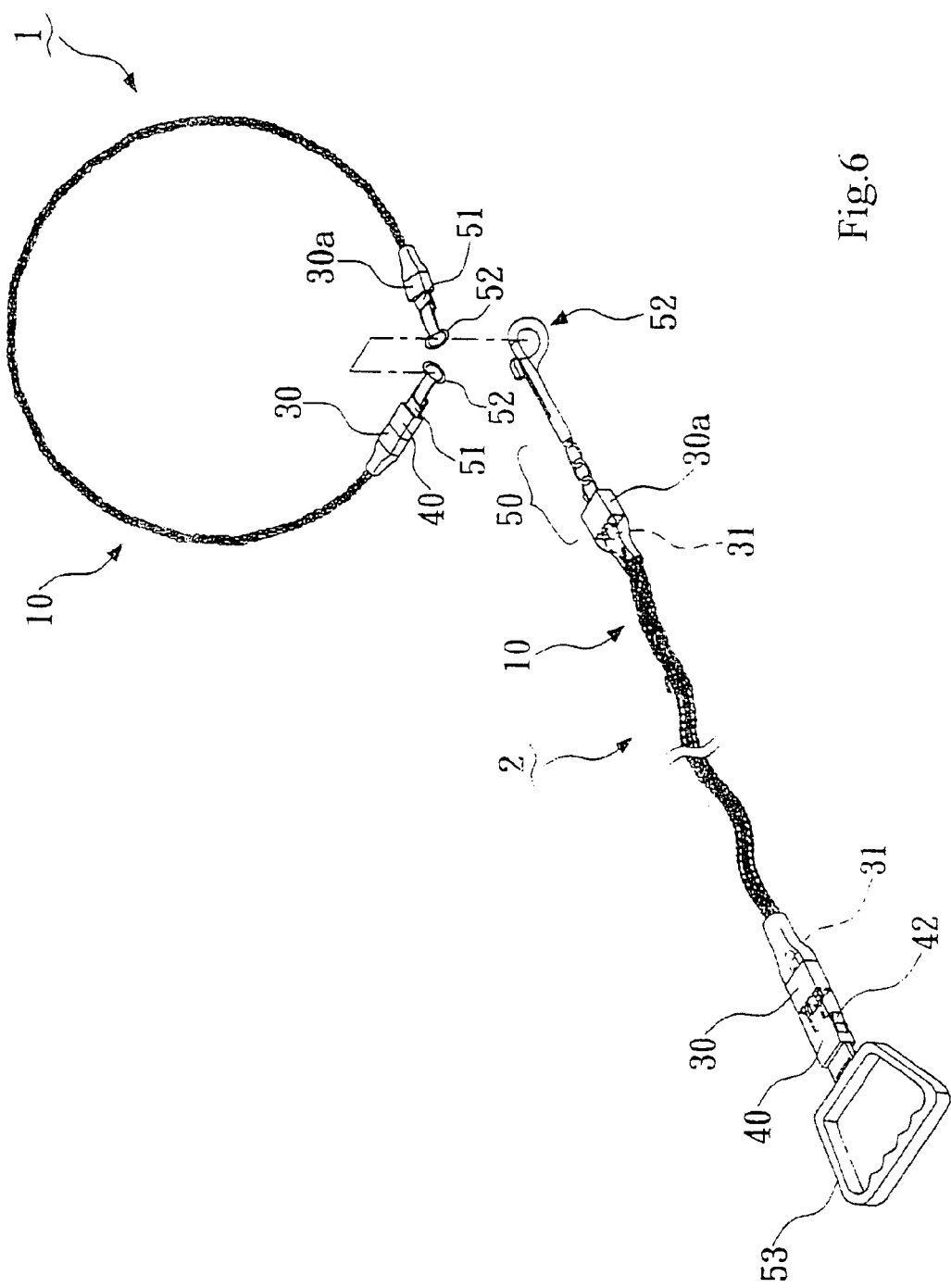
FIG. 6 is a three-dimensional structure in loop state of the present invention.
Figure 7:
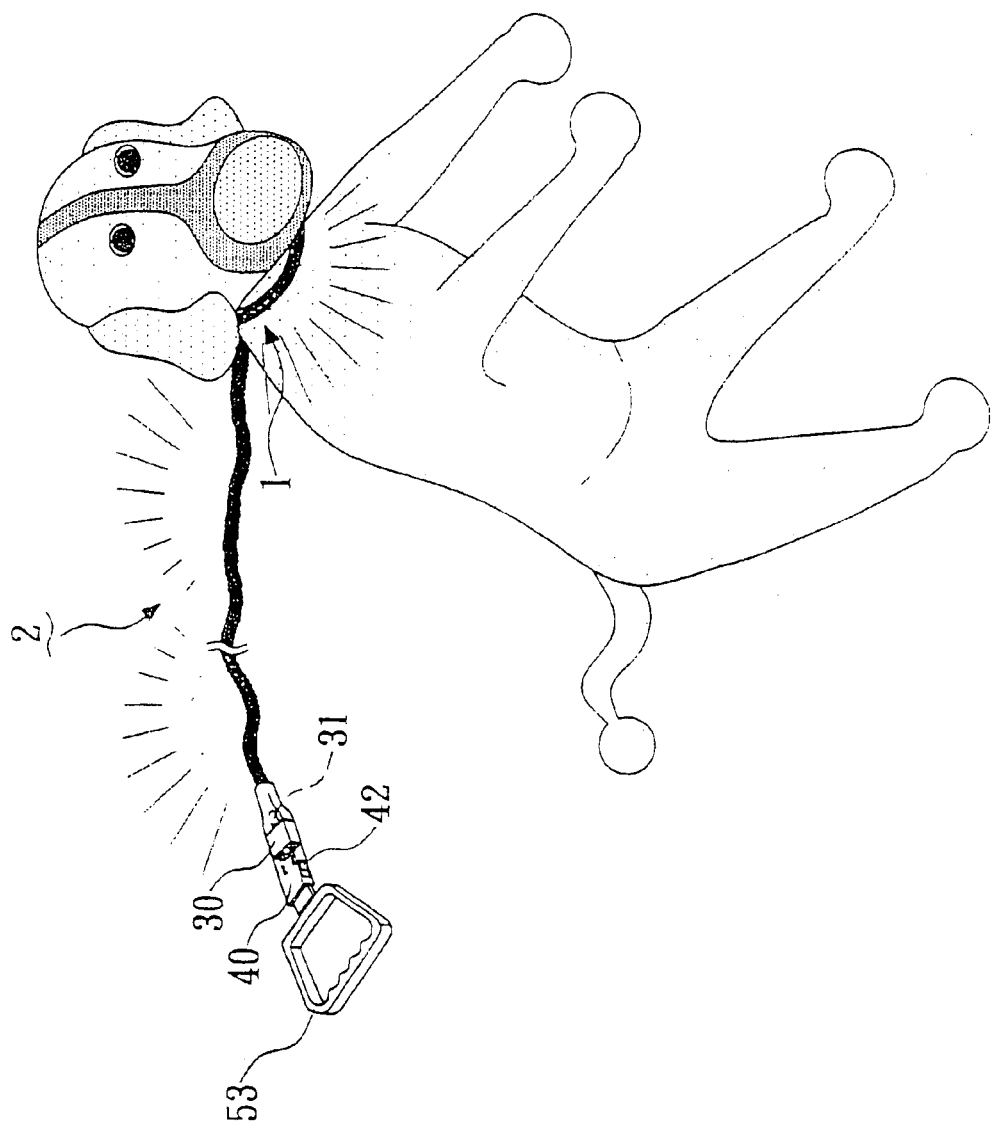
FIG. 7 is a three-dimensional structure for operating condition of the present invention.

Referring to FIGS. 6 and 7, the design of single battery holder 40 can simplify the luminous structure of luminous collar 1 or luminous lead 2, and make LED lamp 31 at both ends of the cable 10 luminous at the same time, and enhance luminous brightness of plastic optical fiber 11 on cable 10, enable the bright display of collar or lead in separate or combined use at night, and have extra functions such as light indication and decoration.

As mentioned above, the structure of this invention was not available in the past, and it can enhance efficiency, conform to new style creation essentials, so, I apply for new creation, and hope your careful examination and approval.

What is claimed is:

1. A structure of luminous pet lead, including a luminous collar and a luminous lead, separately consists of a twist cable, two lamp boxes, a battery holder and fittings, in which: the twist cable is to take the multiple proper-length plastic optical fiber as the outer layer, and the flexible hollow tubule as the inner layer, twisted into a long cable, and a clamping head is respectively fixed on both ends of the cable to prevent cable loosening; the lamp box is connected onto both ends of said cable, in-built with LED lamp, to make the light beam of LED lamp face the end section of plastic optical fiber and shine into plastic optical fiber; the battery holder is attached on a lamp box, for holding the battery; and the electrical conductor is used through hollow tubule of said cable, to connect battery holder power onto the lamp box at other end, to make the LED lamp inside the lamp box luminous using battery holder power; the above-mentioned structure will make LED lamp at both ends of said cable be luminous at the same time, and enhance the luminous brightness of the plastic optical fiber, enable the bright display of said collar or lead in separate or combined use at night, and have extra functions such as light indication and decoration.

2. A structure of luminous pet lead to claim 1, wherein the lamp box have one or more LED lamps.

3. A structure of luminous pet lead according to claim 1, wherein a switch will be setup on the surface of said battery holder or said lamp box so as to control the start-stop of said LED lamp.

4. A structure of luminous pet lead according to claim 1, wherein the twisting mode of said multiple plastic optical fiber and hollow tubule should be use multiple plastic optical fiber to envelop said hollow tubule and form the outer surface of said cable.

* * * * *